(12) United States Patent
Chen et al.

(10) Patent No.: US 8,373,752 B2
(45) Date of Patent: Feb. 12, 2013

(54) DETECTION APPARATUS, DETECTION METHOD AND COMPUTER READABLE MEDIUM THEREOF FOR DETECTING AN OBJECT IN REAL-TIME

(75) Inventors: Jing-Fung Chen, Zhonge (TW); Jen-Chih Wang, Nantou (TW); Chih-Chun Lai, Taipei (TW)

(73) Assignee: Institute for Information Industry, Taipei (TW)

( * ) Notice: Subject to any disclaimer, the term of this patent is extended or adjusted under 35 U.S.C. 154(b) by 482 days.

(21) Appl. No.: 12/627,171

(22) Filed: Nov. 30, 2009

(65) Prior Publication Data
US 2011/0096162 A1   Apr. 28, 2011

(30) Foreign Application Priority Data
Oct. 23, 2009   (TW) ................. 98135917 A

(51) Int. Cl.
*H04N 7/18* (2006.01)
(52) U.S. Cl. .......... 348/142; 382/167; 382/293
(58) Field of Classification Search .......... 348/242, 348/266, 625, 241, 217.1, 229.1, 607, 142; 375/240.16; 382/269, 167, 293
See application file for complete search history.

(56) References Cited

U.S. PATENT DOCUMENTS

| | | | | |
|---|---|---|---|---|
| 7,705,918 B2* | 4/2010 | Yamauchi | | 348/607 |
| 2003/0030753 A1* | 2/2003 | Kondo et al. | | 348/625 |
| 2004/0081239 A1* | 4/2004 | Patti et al. | | 375/240.16 |
| 2005/0053142 A1 | 3/2005 | Holcomb et al. | | |
| 2005/0270388 A1* | 12/2005 | Hamamoto | | 348/242 |
| 2006/0159362 A1* | 7/2006 | Sasaki | | 382/269 |
| 2008/0246861 A1* | 10/2008 | Nishide | | 348/241 |
| 2008/0259181 A1* | 10/2008 | Yamashita et al. | | 348/229.1 |
| 2009/0033753 A1* | 2/2009 | Sato et al. | | 348/217.1 |
| 2010/0027914 A1* | 2/2010 | Terada et al. | | 382/299 |
| 2010/0271515 A1* | 10/2010 | Imagawa et al. | | 348/266 |

OTHER PUBLICATIONS

Office Action for Taiwanese counterpart application (TW 098135917) to the present US application, Sep. 27, 2012; 34 pages (including translation).

\* cited by examiner

*Primary Examiner* — Jungwon Chang
(74) *Attorney, Agent, or Firm* — Skaar Ulbrich Macari, P.A.

(57) ABSTRACT

A detection apparatus, a detection method and a computer readable medium thereof for detecting an object in real time are provided. The detection apparatus is electrically connected to a video capturing apparatus for capturing a video sequence comprising the object. The detection apparatus generates a first transformed frame and a second transformed frame according to the video sequence, and retrieves a plurality of target pixel bits and a plurality of adjacent pixel bits from the first transformed frame. The detection apparatus further interlaces the target pixel bits and the adjacent pixel bits to enhance the accuracy of determining the position where the object appears in the second transformed frame without considerably increasing the computational complexity.

15 Claims, 7 Drawing Sheets

| $D_7$ | $C_7$ | $B_7$ | $A_7$ | $D_6$ | $C_6$ | $B_6$ | $A_6$ | $D_5$ | $C_5$ | $B_5$ | $A_5$ | $D_4$ | $C_4$ | $B_4$ | $A_4$ |

FIG. 5A

| $A_7$ | $B_7$ | $C_7$ | $D_7$ | $A_6$ | $B_6$ | $C_6$ | $D_6$ | $A_5$ | $B_5$ | $C_5$ | $D_5$ | $A_4$ | $B_4$ | $C_4$ | $D_4$ |

FIG. 5B

DETECTION APPARATUS, DETECTION METHOD AND COMPUTER READABLE MEDIUM THEREOF FOR DETECTING AN OBJECT IN REAL-TIME

PRIORITY

This application claims priority to Taiwan Patent Application No. 098135917, filed on Oct. 23, 2009, the disclosure of which is incorporated by reference herein in its entirety.

FIELD

The present invention relates to a detection apparatus, a detection method and a computer readable medium thereof. Specifically, the present invention relates to a detection apparatus, a detection method and a computer readable medium thereof for detecting an object in real time.

BACKGROUND

With the advent of the digital times, presentation of both music and video has transformed from analog signals to digital signals. This transformation has not only enriched the applications of music and video, but has also increased the added value of many electronic products. For example, conventional analog monitors are simply able to capture videos for the purpose of monitoring by a user. However, as a result of digitalization, most of these monitors currently available in the market may be used with a computing device (e.g., a personal computer (PC) or a System on Chip (SOC) device) so that the computing device may apply video images captured by the monitor in real time, thereby increasing the added value of the device remarkably.

To accomplish real-time detection of an object in video images successfully, object detection methods conventionally used can be summarized as follows:

(1) an application of a stable target object is searched for by identifying changes of scenes in video images, and several adjacent images are calculated and processed as a basic processing approach of this method;

(2) a 3D realistic object is established by transforming 2D images captured by multiple image capturing devices at different angles and detecting pixel values of a same object in the 2D frames respectively to improve the accuracy of the object detection; and (3) bit planes of pixels in two consecutive images are compared directly or by detecting a motion vector thereof to accomplish the purpose of real-time anti-shaking detection of the images.

However, the object detection method (1) has to make calculations on at least several adjacent images, which consumes considerable time in calculation and increases the computational complexity; the object detection method (2) may improve the accuracy of object detection by establishing a 3D realistic object, but it also suffers from a considerably increased computational complexity; and the object detection method (3) is able to perform real-time anti-shaking processing on images, but it has no consideration of the reliability of local motion vector (LMV) in the block.

Accordingly, it is highly desirable in the art to provide a solution for detecting an object in video images in real time without compromising the detection accuracy and computational complexity.

SUMMARY

An objective of certain embodiments of the present invention is to provide a detection apparatus for detecting an object in real time. The detection apparatus is electrically connected to a video capturing apparatus (e.g., capture card or others instrument). The video capturing apparatus is configured to capture a video sequence comprising the object. The detection apparatus comprises a storage unit and a microprocessor. The microprocessor is electrically connected to the storage unit. The storage unit is configured to store a noise threshold value for fault-tolerant, search range information as well as a first transformed frame and a second transformed frame generated according to the video sequence. The first transformed frame comprises a first pixel block, which comprises at least a first target pixel and a first adjacent pixel adjacent to the first target pixel. The first target pixel comprises coordinate information with respect to the first transformed frame and the second transformed frame.

The microprocessor is configured to retrieve a plurality of first target pixel bits and a plurality of first adjacent pixel bits from the first target pixel and the first adjacent pixel respectively according to the noise threshold value for fault-tolerant; interlace the plurality of first target pixel bits and the plurality of first adjacent pixel bits to generate a first interlaced bit set; and according to the first interlaced bit set and the search range information, retrieve a plurality of first reliable moving blocks from the second transformed frame to determine a position where the object appears in the second transformed frame.

Another objective of certain embodiments of the present invention is to provide a detection method for detecting an object in real time. The detection method is adapted for use in a detection apparatus. The detection apparatus is electrically connected to a video capturing apparatus. The video capturing apparatus is configured to capture a video sequence comprising the object. The detection apparatus comprises a microprocessor and a storage unit. The microprocessor is electrically connected to the storage unit. The storage unit is configured to store a noise threshold value for fault-tolerant, search range information as well as a first transformed frame and a second transformed frame generated according to the video sequence. The first transformed frame comprises a first pixel block, which at least comprises a first target pixel and a first adjacent pixel adjacent to the first target pixel. The first target pixel comprises coordinate information with respect to the first transformed frame and the second transformed frame.

According to one embodiment, the detection method comprises the steps of: (A) enabling the microprocessor to retrieve a plurality of first target pixel bits and a plurality of first adjacent pixel bits from the first target pixel and the first adjacent pixel respectively according to the noise threshold value for fault-tolerant; (B) enabling the microprocessor to interlace the plurality of first target pixel bits and the plurality of first adjacent pixel bits to generate a first interlaced bit set; and (C) enabling the microprocessor to, according to the first interlaced bit set and the search range information, retrieve a plurality of first reliable moving blocks from the second transformed frame to determine a position where the object appears in the second transformed frame.

Yet a further objective of certain embodiments of the present invention is to provide a computer readable medium, which stores a program of a detection method for use in a detection apparatus for detecting an object in real time. The detection apparatus is electrically connected to a video capturing apparatus. The video capturing apparatus is configured to capture a video sequence comprising the object. The detection apparatus comprises a microprocessor and a storage unit. The microprocessor is electrically connected to the storage unit. The storage unit is configured to store a noise threshold value for fault-tolerant, search range information as well as a first transformed frame and a second transformed frame generated according to the video sequence. The first transformed frame comprises a first pixel block, which at least comprises a first target pixel and a first adjacent pixel adjacent to the first target pixel. The first target pixel comprises coordinate information with respect to the first transformed frame and the second transformed frame.

When loaded into the detection apparatus via a computer, the program executes the following: (1) a code A for enabling the microprocessor to retrieve a plurality of first target pixel bits and a plurality of first adjacent pixel bits from the first target pixel and the first adjacent pixel respectively according to the noise threshold value for fault-tolerant; (2) a code B for enabling the microprocessor to interlace the plurality of first target pixel bits and the plurality of first adjacent pixel bits to generate a first interlaced bit set; and (3) a code C for enabling the microprocessor to, according to the first interlaced bit set and the search range information, retrieve a plurality of first reliable moving blocks from the second transformed frame to determine a position where the object appears in the second transformed frame.

According to the above descriptions, the present invention detects an object from a first transformed frame and a second transformed frame generated according to a video sequence comprising the object. One embodiment of the present invention first retrieves, from the first transformed frame, a plurality of target pixel bits of a target pixel and a plurality of adjacent pixel bits of pixels adjacent to the target pixel, and then interlaces the plurality of target pixel bits with the plurality of adjacent pixel bits to improve the accuracy in determining a position where the object appears in the second transformed frame without increasing the computation complexity considerably. Thereby, the present invention may effectively overcome the problems of conventional object detection technologies in which the accuracy could not be improved without increasing the computation complexity.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 5A is a schematic view of an interlaced bit set of the present invention;

FIG. 5B is a schematic view of another interlaced bit set of the present invention.

Figure 1:
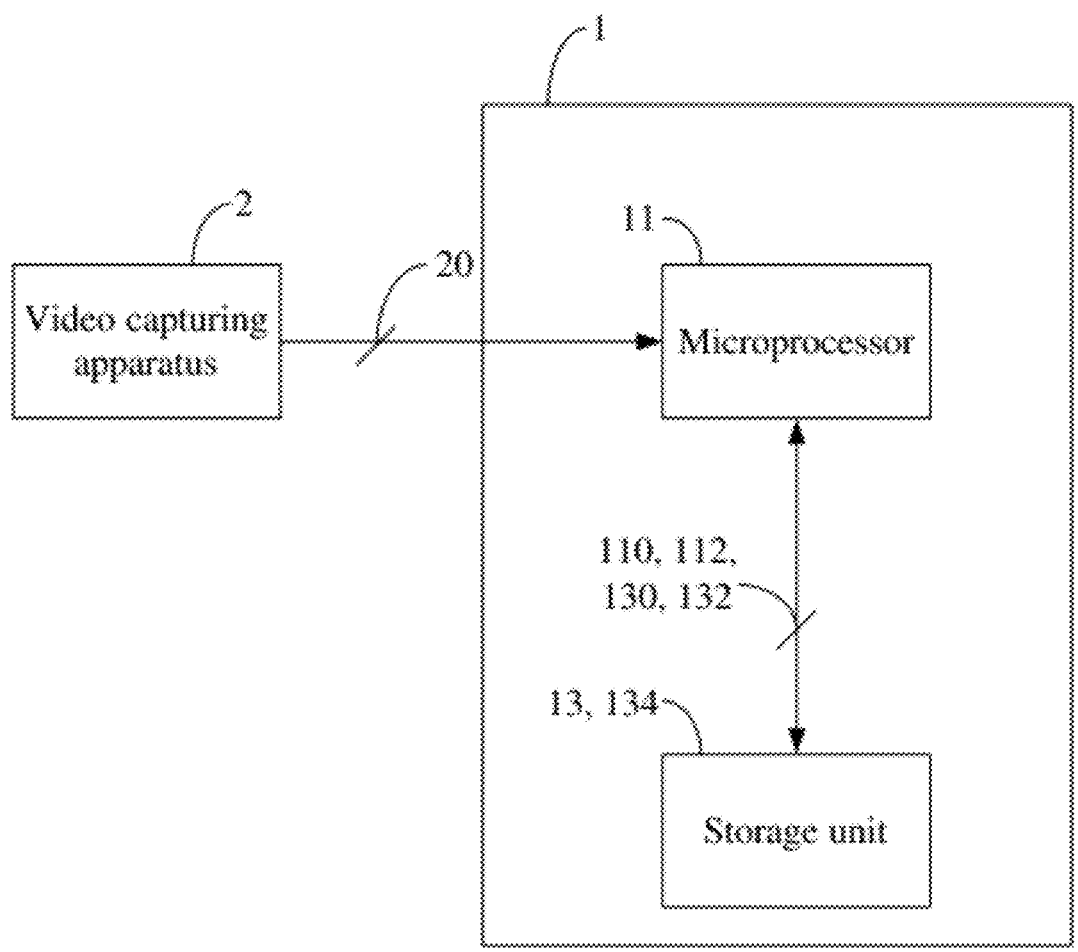
FIG. 1 is a schematic view of a first embodiment of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following description, certain embodiments of the present invention will be explained with reference to embodiments thereof. However, these embodiments are not intended to limit this invention to any specific environment, applications or particular implementations described in these embodiments. Therefore, the description of these embodiments is only for purpose of illustration and not to limit this invention. It should be appreciated that in the following embodiments and the attached drawings, elements unrelated to this invention are omitted from depiction; and dimensional relationships among individual elements in the attached drawings are illustrated only for ease of understanding, but not to limit the actual scale.

A first embodiment of the present invention is shown in FIG. 1, which is a schematic view of a detection system for detecting an object in real time. As can be seen from FIG. 1, the detection system comprises a detection apparatus 1 and a video capturing apparatus 2 (e.g., capture card or others instrument). The video capturing apparatus 2 is electrically connected to the detection apparatus 1, and is configured to capture a video sequence 20 comprising the object. Specifically, the video capturing apparatus 2 is configured to capture a video sequence of the object for purposes of real-time detection of the moving object by the detection apparatus 1. The video capturing apparatus 2 may be any charge coupled device (CCD) camera or any apparatus capable of capturing a video that is available in the market.

The detection apparatus 1 comprises a microprocessor 11 and a storage unit 13. The microprocessor 11 is electrically connected to the storage unit 13 and the video capturing apparatus 2. The storage unit 13 currently stores a noise threshold value for fault-tolerant 130, search range information 132 and a block threshold value 134, functions of which will be described in the following paragraphs.

The video sequence 20 captured by the video capturing apparatus 2 is presented in an original color space and consists of a plurality of original frames. Hence, the microprocessor 11 is configured to retrieve a first original frame and a second original frame, both of which are presented in the original color space, from the video sequence 20, in which the first original frame is captured by the video capturing apparatus 2 before the second original frame. Next, to improve the accuracy in subsequent detection, the microprocessor 11 is further configured to transform the first original frame and the second original frame into an optimized color space to generate a first optimized frame and a second optimized frame respectively.

To enable a full understanding of the present invention, this embodiment will be described by exemplifying the original color space as an RGB color space and the optimized color space as an YCbCr color space in the following description. In other embodiments, the original color space and the optimized color space may also be other color spaces (e.g., a CMYK color space, a YIQ color space, a YUV color space, a YPbPr color space, an xvYCC color space, an HSV color space, an HSL color space and etc) depending on practical needs, and transformation between these color spaces may be accomplished by conventional technologies; this can be readily understood by those of ordinary skill in the art, and will not be further described herein. If the original color space in which the first original frame and the second original frame are presented already meets with the accuracy requirement of subsequent detection, it may also not be transformed into another color space.

Figure 2A:
FIG. 2A is a schematic view of an optimized frame in the first embodiment.

After the first original frame and the second original frame originally presented in the RGB color space are transformed into the first optimized frame and the second optimized frame presented in the YCbCr color space, the first optimized frame and the second optimized frame will consist of a plurality of spectrums (i.e., the spectrum Y, the spectrum Cb and the spectrum Cr). In more detail, with reference to FIGS. 2A and 2B, a schematic view of an optimized frame presented in the YCbCr color space and a schematic view of individual YCbCr spectrums of the optimized frame are shown therein respectively. FIG. 2A is a frame captured by the video capturing apparatus 2, which is digitally presented in the spectrum Y, the spectrum Cb and the spectrum Cr shown in FIG. 2B. Each of these spectrums contains eight bit planes B7-B0. In other words, the frame shown in FIG. 2A consists of a plurality of pixels, and from the perspective of pixels, the pixels of the frame shown in FIG. 2A may also be considered to consist of a plurality of pixel bits contained in the eight bit planes.

To establish correlations among individual pixels subsequent to the generation of the first optimized frame and the second optimized frame, the microprocessor 11 further performs a fast Gray code transformation of Boolean algebra on the first optimized frame and the second optimized frame to generate a first transformed frame 110 and a second transformed frame 112, and then stores the first transformed frame 110 and the second transformed frame 112 into the storage unit 13 for use in subsequent processing.

Figure 3:
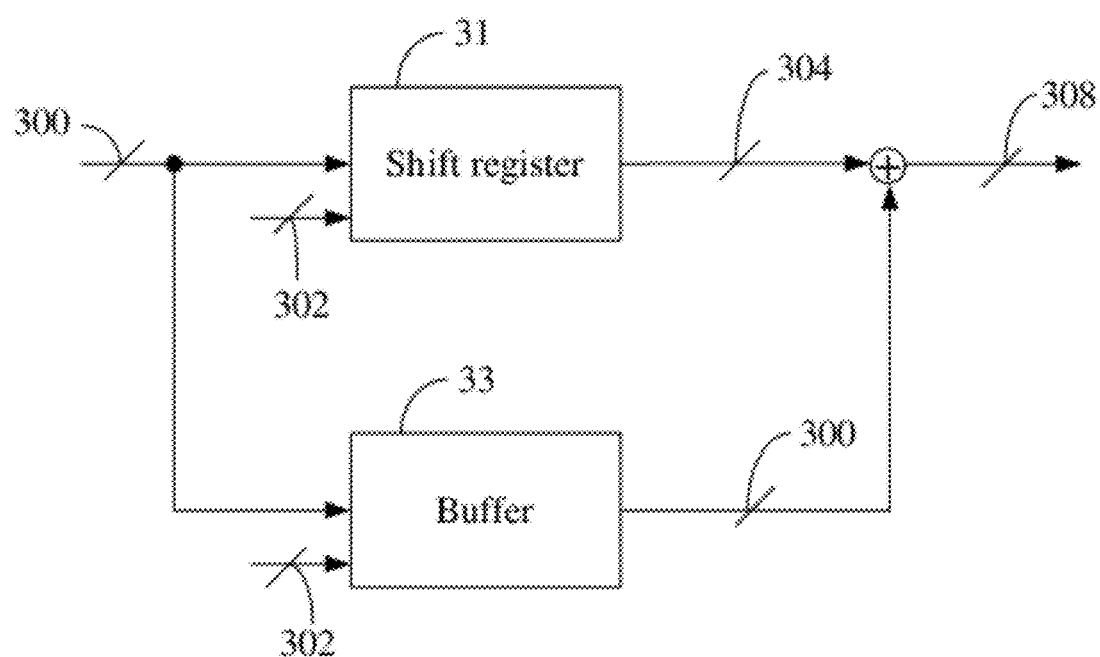
FIG. 3 is a schematic view of a Gray code transformation framework.

In more detail, to prevent the Gray code transformation from incurring an excessively large computational burden, the Grady code transformation is performed in a parallel computing approach. FIG. 3 illustrates a schematic view of a Gray code transformation framework adopting the parallel computing approach. The framework comprises a shift register 31 and a buffer 33. For example, the first optimized frame consists of eight bit planes, and each pixel of the first optimized frame may be considered to be presented by eight bits.

Assuming that a pixel of the first optimized frame is presented by eight bits of (01110011) (i.e., a byte 300). When the Gray code transformation is performed on the pixel, the byte 300 will be sent to the shift register 31 and the buffer 33 at the same time. The shift register 31 is configured to shift all bits of the byte 300 to the right by one bit so that the byte 300 will be transformed into a byte 304 that contains eight bits of (00111001). On the other hand, the buffer 33 is configured to register the byte 300. Upon receiving a clock signal 302, the shift register 31 and the buffer 33 send the byte 304 and the byte 300 respectively so that an exclusion-OR (XOR) operation is made on the byte 304 and the byte 300 to generate a byte 308 containing eight bits of (01001010). As the result obtained by performing the fast Gray code transformation on a pixel of the first optimized frame, the byte 308 may also be viewed as a pixel of the first transformed frame 110.

Additionally, the aforesaid Gray code transformation of Boolean algebra may also be represented in a binary form as $b'=\lceil b/2 \rceil$, $g_j=b_j \oplus b'_j$, $0 \leq j \leq k-1$, wherein k represents the total number of bits, b represents the byte 300, b' represents the byte 304, $b_j$ represents the $j^{th}$ bit of the byte 300, $b'_j$ represents the $j^{th}$ bit of the byte 304, $\oplus$ represents an XOR operation, and $\lceil \ \rceil$ represents a round-down operation. This binary representation will be readily understood by those of ordinary skill in the art and, thus, will not be further described herein.

Figure 4:
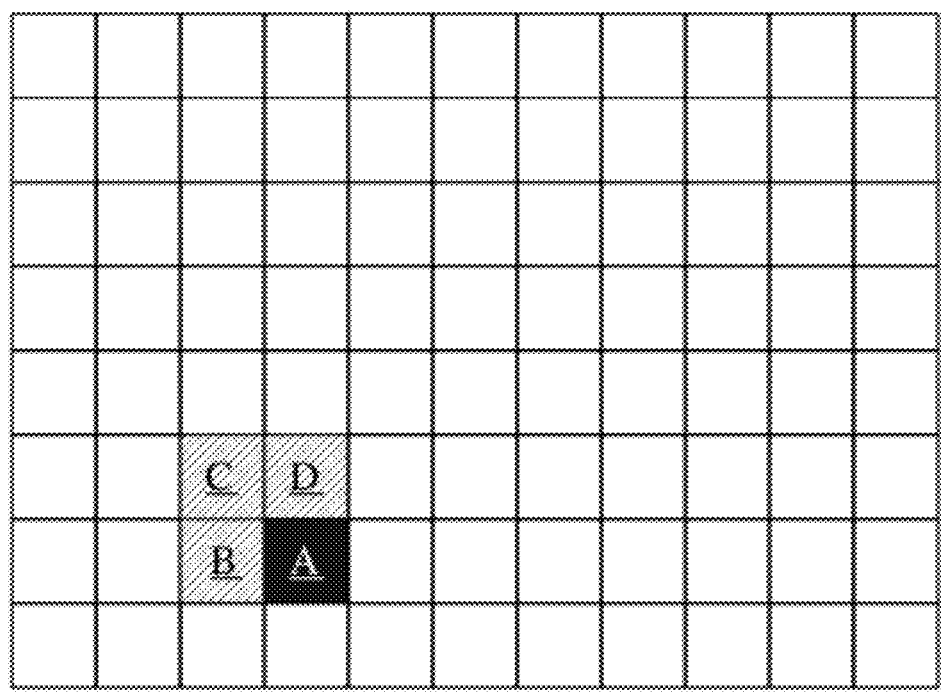
FIG. 4 is a schematic view of a first transformed frame 110 in the first embodiment.

To explain how the present invention detects an object, reference will now be made to FIG. 4, which is a schematic view of the first transformed frame 110. Each small check shown in FIG. 4 may be viewed as a pixel of the first transformed frame 110. The first transformed frame 110 comprises a first pixel block, which at least comprises a first target pixel A (i.e., the black small check shown in FIG. 4) and a first adjacent pixel adjacent to the first target pixel. This embodiment will be described with reference to three first adjacent pixels, namely the first adjacent pixels B, C and D (i.e., the three hatched small checks shown in FIG. 4). The first target pixel A is one of the pixels constituting the object to be detected, and has coordinates (3, 1) with respect to the first transformed frame 110 and the second transformed frame 112. It shall be noted that the number of the first adjacent pixels may be varied depending on the practical conditions rather than being merely limited thereto.

Figure 2B:
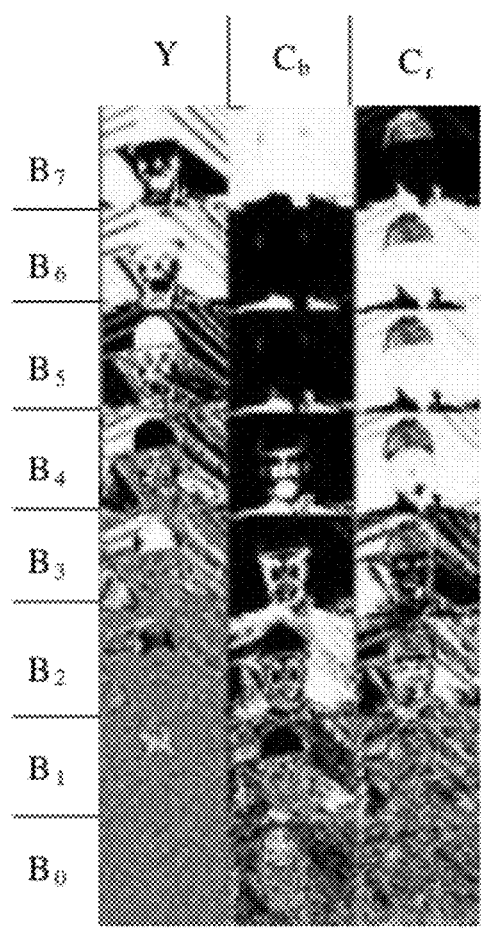
FIG. 2B is a schematic view of a YCbCr spectrum.

It can also be known from FIG. 2B that bit planes contained in the spectrum Y, the spectrum Cb and the spectrum Cr of the YCbCr color space respectively all suffer from noise interference. For example, with spectrum Y, the bit planes B3-B0 thereof suffer from noise interference to a greater extent, while the bit planes B7-B4 suffer from noise interference to a less extent; likewise, the spectrum Cb and the spectrum Cr also suffer from noise interference to a varied extent in different bit planes. Accordingly, to improve the accuracy in the object detection, the microprocessor 11 is further configured to, according to the noise threshold value for fault-tolerant stored in the storage unit 13, retrieve a plurality of first target pixel bits and a plurality of first adjacent pixel bits from the first target pixel A and the first adjacent pixels B, C and D respectively in order to filter out pixel bits that suffer from noise interference to a greater extent.

For example, in spectrum Y, after the pixel bits suffer from noise interference to a greater extent are filtered out, the first target pixel A contains the first target pixel bits A7, A6, A5 and A4, the first adjacent pixel B contains the first adjacent pixel bits B7, B6, B5 and B4, the first adjacent pixel C contains the first adjacent pixel bits C7, C6, C5 and C4, and the first adjacent pixel D contains the first adjacent pixel bits D7, D6, D5 and D4. The first target pixel bits A7, A6, A5 and A4, and the first adjacent pixel bits B7, B6, B5, B4, C7, C6, C5, C4, D7, D6, D5 and D4 are all contained in the bit planes B7-B4 that suffer from noise interference to a lesser extent.

Next, the microprocessor 11 interlaces the first target pixel bits A7, A6, A5 and A4, and the first adjacent pixel bits B7, B6, B5, B4, C7, C6, C5, C4, D7, D6, D5 and D4 to generate a first interlaced bit set and, according to the first interlaced bit set and the search range information 132 stored in the storage unit 13, retrieves a plurality of first reliable moving blocks from the second transformed frame 112 to determine a position where the object appears in the second transformed frame 112.

In more detail, with reference to FIGS. 5A and 5B, schematic views of examples of the first interlaced bit set are shown therein respectively. To effectively reduce the error rate of determining the position where the object appears in the second transformed frame 112 solely according to the first target pixel bits A7, A6, A5 and A4 of the first target pixel, the microprocessor 11 interlaces the first target pixel bits A7, A6, A5 and A4, and the first adjacent pixel bits B7, B6, B5, B4, C7, C6, C5, C4, D7, D6, D5 and D4 to generate a first interlaced bit set as shown in FIG. 5A or 5B. It shall be noted that the first target pixel bits and the first adjacent pixel bits may also be interlaced in other arrangements rather than being merely limited thereto.

Next, according to the first interlaced bit set and the search range information 132 stored in the storage unit 13, the microprocessor 11 makes a motion estimation on the second transformed frame 112 to retrieve a plurality of first original moving blocks. For example, if the search range information 132 indicates that searching for the first original moving blocks shall be made within a range of pixels-matrix (e.g. 5×5 or others size) around the first target pixel, then the microprocessor 11 will search for the first original moving blocks within a range circled by pixels with coordinates of (8, 6), (8, −4), (−2, 6) and (−2, −4).

Once the first original moving blocks are found, the microprocessor 11 performs an unnecessary motion cancellation on each of the first original moving blocks to generate the first reliable moving blocks for use to determine the position where the object appears in the second transformed frame 112. The aforesaid motion estimation and unnecessary motion cancellation may be accomplished through conventional technologies and, thus, will not be further described herein.

Furthermore, it is possible for the video sequence 20 to be stationary in the first three seconds and does not begin to move until the fourth second. The second original frame is taken from the first three seconds of the video sequence 20, making it impossible to retrieve an adequate number of the first reliable moving block. Accordingly, the microprocessor 11 is further configured to determine whether the number of the first reliable moving blocks is less than the block threshold value 134 stored in the storage unit 13. If the number of the first reliable moving blocks is no less than a block threshold value 134 stored in the storage unit 13, then the microprocessor 11 groups these first reliable moving blocks.

Otherwise, if the number of the first reliable moving blocks is less than a block threshold value 134 stored in the storage unit 13, it means that the object is almost stationary in the second original frame. In response to the determination result, the microprocessor 11 retrieves from the video sequence 20 a third original frame which is also presented in the original color space. Next, as with the first original frame and the second original frame described above, the microprocessor 11 is further configured to transform the third original frame from the original color space into the optimized color space to generate a third optimized frame, and perform the Gray code transformation on the third optimized frame to generate a third transformed frame. Finally, the microprocessor 11 stores the third transformed frame also into the storage unit 13.

Furthermore, according to the first interlaced bit set and the search range information 132, the microprocessor 11 makes a motion estimation on the third transformed frame to retrieve a plurality of second original moving blocks, and performs an unnecessary motion cancellation on each of the second original moving blocks to generate a plurality of second reliable moving blocks for use to determine a position where the object appears in the third transformed frame. Of course, the microprocessor 11 also determines whether the number of second reliable moving blocks is less than the block threshold value 134 of the storage unit 13. If so, a next frame will be retrieved from the video sequence 20 until the number of the reliable moving blocks retrieved from the frame is no less than the block threshold value 134.

Figure 6A:
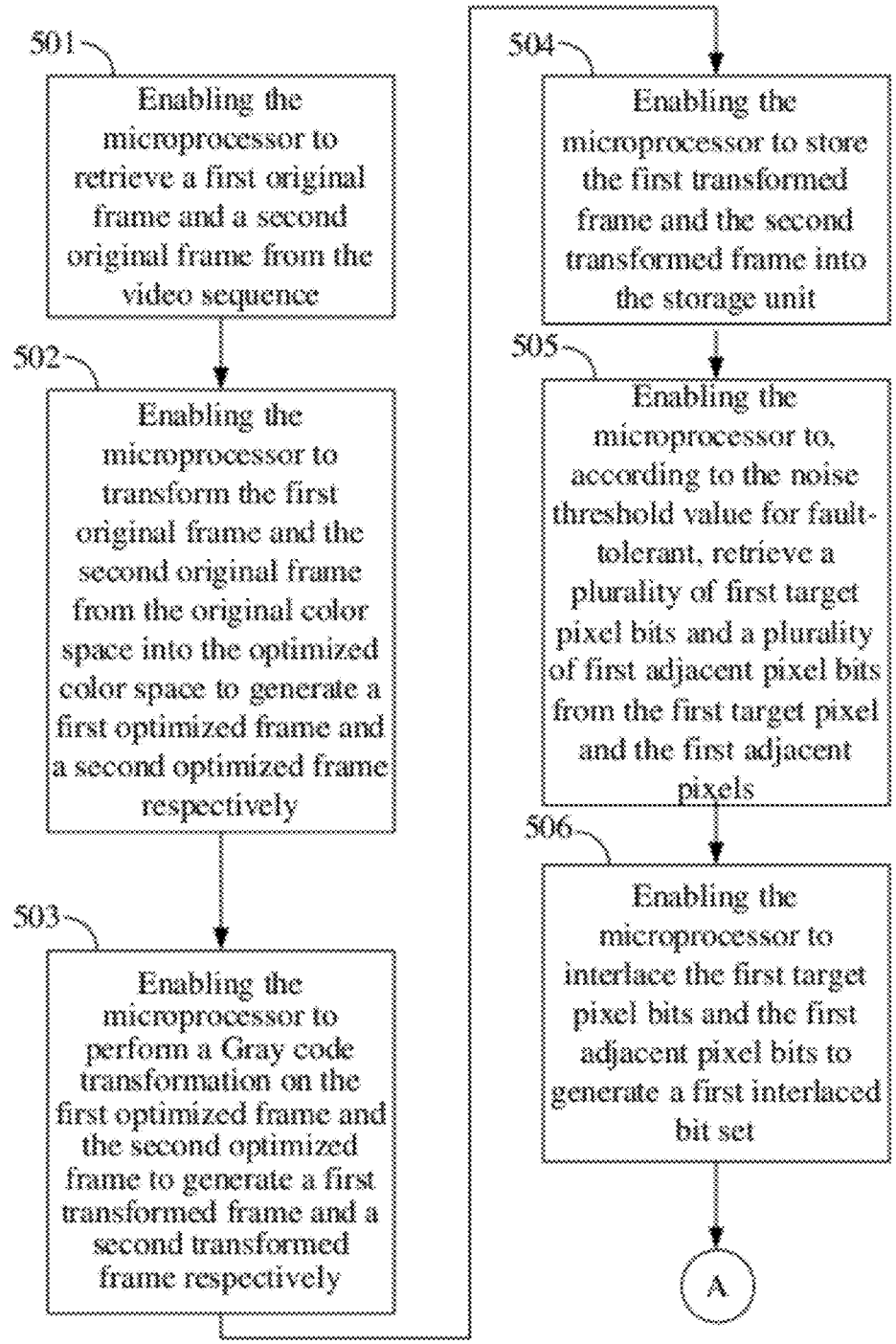
FIGS. 6A-6B are flowcharts of a second embodiment of the present invention.
Figure 6B:
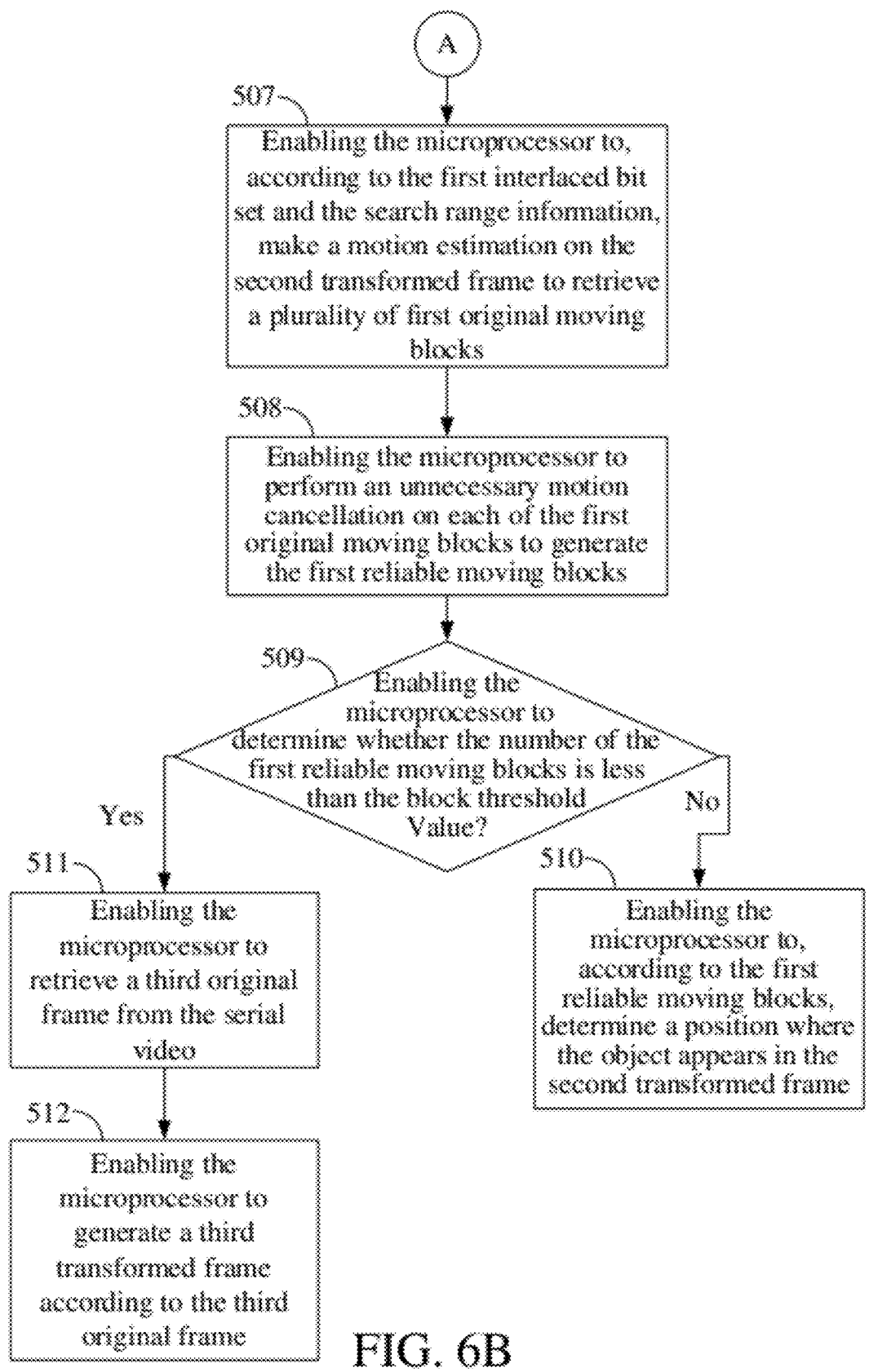

As shown in FIGS. 6A and 6B, a second embodiment of the present invention is a detection method for detecting an object in real time. The detection method is adapted for use in a detection apparatus such as that described in the first embodiment. The detection apparatus is electrically connected to a video capturing apparatus. The video capturing apparatus is configured to capture a video sequence comprising the object. Specifically, the video capturing apparatus is configured to capture a video sequence of the object for purposes of real-time detection of the moving object by the detection apparatus, and the video capturing apparatus may be any CCD camera or any apparatus capable of capturing a video that is available in the market.

The detection apparatus comprises a microprocessor and a storage unit. The microprocessor is electrically connected to the storage unit. The storage unit currently stores a noise threshold value for fault-tolerant, search range information and a block threshold value, functions of which will be described in the following paragraphs.

Additionally, the detection method of the second embodiment may be implemented by a computer readable medium which, when being loaded into the detection apparatus via a computer and a plurality of codes contained therein are executed, can accomplish the detection method of the second embodiment. This computer readable medium may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

In reference to FIG. 6A, the video sequence captured by the video capturing apparatus is presented in an original color space and consists of a plurality of original frames. In step 501, the microprocessor is enabled to retrieve a first original frame and a second original frame, both of which are presented in the original color space, from the video sequence, in which the first original frame is captured by the video capturing apparatus ahead of the second original frame. Next, to improve the accuracy in subsequent detection, the microprocessor is enabled in step 502 to transform the first original frame and the second original frame from the original color space into the optimized color space to generate a first optimized frame and a second optimized frame respectively.

To enable a full understanding of the present invention, this embodiment will be described by exemplifying the original color space as an RGB color space and the optimized color space as a YCbCr color space in the following description. In other embodiments, the original color space and the optimized color space may also be other color spaces (e.g., a CMYK color space, a YIQ color space, a YUV color space, a YPbPr color space, an xvYCC color space, an HSV color space, an HSL color space and etc) depending on the practical needs. Transformation between these color spaces may be accomplished by conventional technologies; this can be readily understood by those of ordinary skill in the art, and will not be further described herein. Besides, if the original color space in which the first original frame and the second original frame are presented already meets with the accuracy requirement of subsequent detection, step 502 may also be eliminated.

After the first original frame and the second original frame originally presented in the RGB color space are transformed into the first optimized frame and the second optimized frame presented in the YCbCr color space, the first optimized frame and the second optimized frame will consist of a plurality of spectrums (i.e., the spectrum Y, the spectrum Cb and the spectrum Cr). In more detail, with reference to FIGS. 2A and 2B, a schematic view of an optimized frame presented in the YCbCr color space and a schematic view of individual YCbCr spectrums of the optimized frame are shown therein respectively. FIG. 2A is a frame captured by the video capturing apparatus, which is digitally presented in the spectrum Y, the spectrum Cb and the spectrum Cr shown in FIG. 2B. Each of these spectrums contains eight bit planes B7-B0. In other words, the frame shown in FIG. 2A consists of a plurality of pixels, and from the perspective of pixels, the pixels of the frame shown in FIG. 2A may also be considered to consist of a plurality of pixel bits contained in the eight bit planes.

Subsequent to step 502, to render the first optimized frame and the second optimized frame more suited to the visual effect of people's eyes, the microprocessor is enabled in step 503 to perform a Gray code transformation on the first optimized frame and the second optimized frame to generate a first transformed frame and a second transformed frame respectively. Here, the Gray code transformation is just the same as that described in the first embodiment, and will not be further described herein. In step 504, the microprocessor is enabled to store the first transformed frame and the second transformed frame into the storage unit for use in subsequent processing.

Furthermore, to explain how the present invention detects an object, reference will now be made back to FIG. 4, which is a schematic view of the first transformed frame. Each small check shown in FIG. 4 may be viewed as a pixel of the first transformed frame. The first transformed frame comprises a first pixel block, which at least comprises a first target pixel A (i.e., the black small check shown in FIG. 4) and a first adjacent pixel adjacent to the first target pixel. This embodiment will be described with reference to three first adjacent pixels, namely the first adjacent pixels B, C and D (i.e., the three hatched small checks shown in FIG. 4). The first target pixel A is one of the pixels constituting the object to be detected, and has coordinates (3, 1) with respect to the first transformed frame and the second transformed frame. It shall be noted that the number of the first adjacent pixels may be varied depending on the practical conditions rather than being merely limited thereto.

It can also be known from FIG. 2B that bit planes contained in the spectrum Y, the spectrum Cb and the spectrum Cr of the YCbCr color space respectively all suffer from noise interference. For example, with spectrum Y, the bit planes B3-B0 thereof suffer from noise interference to a greater extent, while the bit planes B7-B4 suffer from noise interference to a less extent; likewise, the spectrum Cb and the spectrum Cr also suffer from noise interference to a varied extent in different bit planes. Accordingly, to improve the accuracy in the object detection, the microprocessor is enabled in step 505 to, according to the noise threshold value for fault-tolerant 130, retrieve a plurality of first target pixel bits and a plurality of first adjacent pixel bits from the first target pixel and the first adjacent pixels respectively to filter out pixel bits that suffer from noise interference to a greater extent.

Furthermore, in spectrum Y, after the pixel bits that suffer from noise interference to a greater extent are filtered out, the first target pixel A contains the first target pixel bits A7, A6, A5 and A4, the first adjacent pixel B contains the first adjacent pixel bits B7, B6, B5 and B4, the first adjacent pixel C contains the first adjacent pixel bits C7, C6, C5 and C4, and the first adjacent pixel D contains the first adjacent pixel bits D7, D6, D5 and D4. The first target pixel bits A7, A6, A5 and A4, and the first adjacent pixel bits B7, B6, B5, B4, C7, C6, C5, C4, D7, D6, D5 and D4 are all contained in the bit planes B7-B4 that suffer from noise interference to a lesser extent.

Next in step 506, the microprocessor is enabled to interlace the first target pixel bits A7, A6, A5 and A4, and the first adjacent pixel bits B7, B6, B5, B4, C7, C6, C5, C4, D7, D6, D5 and D4 to generate a first interlaced bit set. In more detail, with reference to FIGS. 5A and 5B, schematic views of examples of the first interlaced bit set are shown therein respectively. To effectively reduce the error rate of determining the position where the object appears in the second transformed frame 112 solely according to the first target pixel bits A7, A6, A5 and A4 of the first target pixel, the first target pixel bits A7, A6, A5 and A4, and the first adjacent pixel bits B7, B6, B5, B4, C7, C6, C5, C4, D7, D6, D5 and D4 are interlaced in step 506 to generate a first interlaced bit set as shown in FIG. 5A or 5B. It shall be noted that the first target pixel bits and the first adjacent pixel bits may also be interlaced in other arrangements rather than being merely limited thereto.

In step 507, the microprocessor is enabled to, according to the first interlaced bit set and the search range information, make a motion estimation on the second transformed frame to retrieve a plurality of first original moving blocks. For example, if the search range information indicates that searching for the first original moving blocks shall be made within a range of pixels-matrix (e.g. 5×5 or others size) around the first target pixel, then a search for the first original moving blocks will be made within a range circled by pixels with coordinates of (8, 6), (8, −4), (−2, 6) and (−2, −4) in the step 507.

Once the first original moving blocks are found, the microprocessor is enabled in step 508 to perform an unnecessary motion cancellation on each of the first original moving blocks to generate the first reliable moving blocks for use to determine the position where the object appears in the second transformed frame. The aforesaid motion estimation and unnecessary motion cancellation may be accomplished through conventional technologies and, thus, will not be further described herein.

Then, in step 509, the microprocessor is enabled to determine whether the number of the first reliable moving blocks is less than the block threshold value. If not, then step 510 is executed to enable the microprocessor to, according to the first reliable moving blocks, determine a position where the object appears in the second transformed frame. Otherwise, if the number of the first reliable moving blocks is less than the block threshold value, step 511 is executed to enable the microprocessor to retrieve a third original frame from the video sequence, and finally in step 512, the microprocessor is enabled to, according to the third original frame, generate a third transformed frame for retrieving a plurality of third reliable moving blocks therefrom. The way in which the third transformed frame is generated is the same as that of the first transformed frame and the second transformed frame, and the way in which the third reliable moving blocks are retrieved is the same as that of the first reliable moving blocks and the second reliable moving blocks, so these will not be further described herein.

In addition to the aforesaid steps, the second embodiment can also execute all the operations and functions set forth in the first embodiment. The method in which the second embodiment executes these operations and functions will be readily appreciated by those of ordinary skill in the art based on the explanation of the first embodiment, and thus will not be further described herein.

According to the above descriptions, the disclosed invention detects an object from a first transformed frame and a second transformed frame generated according to a video sequence comprising the object. The present disclosed invention firstly retrieves, from the first transformed frame, a plurality of target pixel bits of a target pixel and a plurality of adjacent pixel bits of pixels adjacent to the target pixel, and then interlaces the plurality of target pixel bits with the plurality of adjacent pixel bits to improve the accuracy in determining a position where the object appears in the second transformed frame without increasing the computation complexity considerably. Thereby, the present disclosed invention can effectively overcome the problem that the conventional object detection technologies cannot improve the accuracy without increasing the computation complexity.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A detection apparatus for detecting an object in real time, being electrically connected to a video capturing apparatus, the video capturing apparatus being configured to capture a video sequence comprising the object, the detection apparatus comprising:
   a storage unit, being configured to store a noise threshold value for fault-tolerant, search range information as well as a first transformed frame and a second transformed frame generated according to the video sequence, wherein the first transformed frame comprises a first pixel block which at least comprises a first target pixel and a first adjacent pixel adjacent to the first target pixel, and the first target pixel comprises coordinate information with respect to the first transformed frame and the second transformed frame; and
   a microprocessor, being electrically connected to the storage unit and configured to:
      retrieve a plurality of first target pixel bits and a plurality of first adjacent pixel bits from the first target pixel and the first adjacent pixel respectively according to the noise threshold value for fault-tolerant;
      interlace the plurality of first target pixel bits and the plurality of first adjacent pixel bits to generate a first interlaced bit set; and
      according to the first interlaced bit set and the search range information, retrieve a plurality of first reliable moving blocks from the second transformed frame to determine a position where the object appears in the second transformed frame.

2. The detection apparatus as claimed in claim 1, wherein the microprocessor is further configured to:
   according to the first interlaced bit set and the search range information, make a motion estimation on the second transformed frame to retrieve a plurality of first original moving blocks; and
   perform an unnecessary motion cancellation on each of the first original moving blocks to generate the first reliable moving blocks.

3. The detection apparatus as claimed in claim 1, wherein the first transformed frame and the second transformed frame are presented in an optimized color space, and the microprocessor is further configured to:
   retrieve from the video sequence a first original frame and a second original frame, both of which are presented in an original color space;
   transform the first original frame and the second original frame from the original color space into the optimized color space to generate a first optimized frame and a second optimized frame respectively; and
   perform a Gray code transformation on the first optimized frame and the second optimized frame to generate the first transformed frame and the second transformed frame respectively.

4. The detection apparatus as claimed in claim 3, wherein the storage unit is further configured to store a block threshold value, and the microprocessor is further configured to:
   determine that a number of the first reliable moving blocks is less than the block threshold value to generate a determination result;
   according to the determination result, retrieve from the video sequence a third original frame which is presented in the original color space;
   transform the third original frame from the original color space into the optimized color space to generate a third optimized frame;
   perform the Gray code transformation on the third optimized frame to generate a third transformed frame; and
   store the third transformed frame into the storage unit.

5. The detection apparatus as claimed in claim 4, wherein the microprocessor is further configured to:
   according to the first interlaced bit set and the search range information, make a motion estimation on the third transformed frame to retrieve a plurality of second original moving blocks; and
   perform an unnecessary motion cancellation on each of the second original moving blocks to generate a plurality of second reliable moving blocks for use to determine a position where the object appears in the third transformed frame.

6. A detection method for detecting an object in real time, the detection method being adapted for use in a detection apparatus, the detection apparatus being electrically connected to a video capturing apparatus, the video capturing apparatus being configured to capture a video sequence comprising the object, the detection apparatus comprising a microprocessor and a storage unit, the microprocessor being electrically connected to the storage unit, the storage unit being configured to store a noise threshold value for fault-tolerant, search range information as well as a first transformed frame and a second transformed frame generated according to the video sequence, the first transformed frame comprising a first pixel block at least comprising a first target pixel and a first adjacent pixel adjacent to the first target pixel, the first target pixel comprising coordinate information with respect to the first transformed frame and the second transformed frame, the detection method comprising the following steps of:
   (A) enabling the microprocessor to retrieve a plurality of first target pixel bits and a plurality of first adjacent pixel bits from the first target pixel and the first adjacent pixel respectively according to the noise threshold value for fault-tolerant;
   (B) enabling the microprocessor to interlace the plurality of first target pixel bits and the plurality of first adjacent pixel bits to generate a first interlaced bit set; and
   (C) enabling the microprocessor to, according to the first interlaced bit set and the search range information, retrieve a plurality of first reliable moving blocks from the second transformed frame to determine a position where the object appears in the second transformed frame.

7. The detection method as claimed in claim 6, wherein the step (C) further comprises the following steps of:
   enabling the microprocessor to make a motion estimation on the second transformed frame according to the first interlaced bit set and the search range information to retrieve a plurality of first original moving blocks; and
   enabling the microprocessor to perform an unnecessary motion cancellation on each of the first original moving blocks to generate the first reliable moving blocks.

8. The detection method as claimed in claim 6, wherein the first transformed frame and the second transformed frame are presented in an optimized color space, and the detection method further comprises the steps of:
- enabling the microprocessor to retrieve from the video sequence a first original frame and a second original frame, both of which are presented in an original color space;
- enabling the microprocessor to transform the first original frame and the second original frame from the original color space into the optimized color space to generate a first optimized frame and a second optimized frame respectively; and
- enabling the microprocessor to perform a Gray code transformation on the first optimized frame and the second optimized frame to generate the first transformed frame and the second transformed frame respectively.

9. The detection method as claimed in claim 8, wherein the storage unit is further configured to store a block threshold value, and the detection method further comprises the following steps of:
- enabling the microprocessor to determine that a number of the first reliable moving blocks is less than the block threshold value to generate a determination result;
- enabling the microprocessor to, according to the determination result, retrieve from the video sequence a third original frame which is presented in the original color space;
- enabling the microprocessor to transform the third original frame from the original color space into the optimized color space to generate a third optimized frame;
- enabling the microprocessor to perform the Gray code transformation on the third optimized frame to generate a third transformed frame; and
- enabling the microprocessor to store the third transformed frame into the storage unit.

10. The detection method as claimed in claim 9, further comprising the following steps of:
- enabling the microprocessor to, according to the first interlaced bit set and the search range information, make a motion estimation on the third transformed frame to retrieve a plurality of second original moving blocks; and
- enabling the microprocessor to perform an unnecessary motion cancellation on each of the second original moving blocks to generate a plurality of second reliable moving blocks for use to determine a position where the object appears in the third transformed frame.

11. A non-transitory computer readable medium, storing a program of a detection method for use in a detection apparatus for detecting an object in real time, the detection apparatus being electrically connected to a video capturing apparatus, the video capturing apparatus being configured to capture a video sequence comprising the object, the detection apparatus comprising a microprocessor and a storage unit, the microprocessor being electrically connected to the storage unit, the storage unit being configured to store a noise threshold value for fault-tolerant, search range information as well as a first transformed frame and a second transformed frame generated according to the video sequence, the first transformed frame comprising a first pixel block at least comprising a first target pixel and a first adjacent pixel adjacent to the first target pixel, the first target pixel comprising coordinate information with respect to the first transformed frame and the second transformed frame, the program being loaded into the detection apparatus via a computer and then executing:
- a code A for enabling the microprocessor to retrieve a plurality of first target pixel bits and a plurality of first adjacent pixel bits from the first target pixel and the first adjacent pixel respectively according to the noise threshold value for fault-tolerant;
- a code B for enabling the microprocessor to interlace the plurality of first target pixel bits and the plurality of first adjacent pixel bits to generate a first interlaced bit set; and
- a code C for enabling the microprocessor to, according to the first interlaced bit set and the search range information, retrieve a plurality of first reliable moving blocks from the second transformed frame to determine a position where the object appears in the second transformed frame.

12. The non-transitory computer readable medium as claimed in claim 11, wherein the code C comprises:
- a code C1 for enabling the microprocessor to make a motion estimation on the second transformed frame according to the first interlaced bit set and the search range information to retrieve a plurality of first original moving blocks; and
- a code C2 for enabling the microprocessor to perform an unnecessary motion cancellation on each of the first original moving blocks to generate the first reliable moving blocks.

13. The non-transitory computer readable medium as claimed in claim 11, wherein the first transformed frame and the second transformed frame are presented in an optimized color space, and the program further executes:
- a code D for enabling the microprocessor to retrieve from the video sequence a first original frame and a second original frame, both of which are presented in an original color space;
- a code E for enabling the microprocessor to transform the first original frame and the second original frame from the original color space into the optimized color space to generate a first optimized frame and a second optimized frame respectively; and
- a code F for enabling the microprocessor to perform a Gray code transformation on the first optimized frame and the second optimized frame to generate the first transformed frame and the second transformed frame respectively.

14. The non-transitory computer readable medium as claimed in claim 13, wherein the storage unit is further configured to store a block threshold value, and the program further executes:
- a code G for enabling the microprocessor to determine that a number of the first reliable moving blocks is less than the block threshold value to generate a determination result;
- a code H for enabling the microprocessor to, according to the determination result, retrieve from the video sequence a third original frame which is presented in the original color space;
- a code I for enabling the microprocessor to transform the third original frame from the original color space into the optimized color space to generate a third optimized frame;
- a code J for enabling the microprocessor to perform the Gray code transformation on the third optimized frame to generate a third transformed frame; and
- a code K for enabling the microprocessor to store the third transformed frame into the storage unit.

15. The non-transitory computer readable medium as claimed in claim 14, wherein the program further executes:
   a code L for enabling the microprocessor to, according to the first interlaced bit set and the search range information, make a motion estimation on the third transformed frame to retrieve a plurality of second original moving blocks; and
   a code M for enabling the microprocessor to perform an unnecessary motion cancellation on each of the second original moving blocks to generate a plurality of second reliable moving blocks for use to determine a position where the object appears in the third transformed frame.

* * * * *